United States Patent
Ritter

(10) Patent No.: US 11,159,910 B2
(45) Date of Patent: *Oct. 26, 2021

(54) METHOD FOR PERFORMING LOCATION-SPECIFIC SERVICES, BROADCASTING UNIT AND MOBILE RECEIVING DEVICE

(71) Applicant: Swisscom AG, Bern (CH)

(72) Inventor: Rudolf Ritter, Zollikofen (CH)

(73) Assignee: SWISSCOM AG

(*) Notice: Subject to any disclaimer, the term of this patent is extended or adjusted under 35 U.S.C. 154(b) by 88 days.

This patent is subject to a terminal disclaimer.

(21) Appl. No.: 15/206,979

(22) Filed: Jul. 11, 2016

(65) Prior Publication Data

US 2017/0013400 A1  Jan. 12, 2017

Related U.S. Application Data

(63) Continuation of application No. 11/909,766, filed as application No. PCT/CH2006/000182 on Mar. 29, 2006, now Pat. No. 9,392,400.

(30) Foreign Application Priority Data

Mar. 29, 2005 (CH) ..................... 00531/05

(51) Int. Cl.
*H04W 4/021* (2018.01)
*H04B 7/0413* (2017.01)
(Continued)

(52) U.S. Cl.
CPC .......... *H04W 4/021* (2013.01); *B64C 39/024* (2013.01); *H04B 7/0413* (2013.01);
(Continued)

(58) Field of Classification Search
CPC ......... H04W 4/02; H04W 4/008; H04W 4/14; H04W 4/22; H04W 4/021; G06Q 30/06;
(Continued)

(56) References Cited

U.S. PATENT DOCUMENTS 6,088,598 A * 7/2000 Marsolais ......... H04M 15/8033
455/414.1
6,424,840 B1  7/2002 Fitch et al.
(Continued)

FOREIGN PATENT DOCUMENTS

EP  1420599  5/2004

*Primary Examiner* — Fred A Casca
(74) *Attorney, Agent, or Firm* — McAndrews, Held & Malloy, Ltd.

(57) ABSTRACT

Methods and systems are provided for providing location-specific services. A mobile device may receive from a broadcasting unit, geographic data corresponding to a service region associated with the broadcasting unit, with the geographic data defining a three-dimensional geographic space. A current three-dimensional geographic position of the mobile receiving device may be determined in the mobile receiving device; and based on the current three-dimensional geographic position of the mobile receiving device, presence of the mobile receiving device in the three-dimensional geographic space may be determined. A service provided in the three-dimensional geographic space may then be performed.

22 Claims, 2 Drawing Sheets

(51) Int. Cl.
*H04W 4/029* (2018.01)
*B64C 39/02* (2006.01)
*H04B 7/0417* (2017.01)
*H04W 16/24* (2009.01)
*H04B 7/06* (2006.01)
*H04W 72/00* (2009.01)
*H04W 4/06* (2009.01)

(52) U.S. Cl.
CPC .......... *H04B 7/0417* (2013.01); *H04W 4/029* (2018.02); *H04W 16/24* (2013.01); *B64C 2201/12* (2013.01); *H04B 7/0695* (2013.01); *H04W 4/06* (2013.01); *H04W 72/005* (2013.01)

(58) Field of Classification Search
CPC .... G06Q 10/10; G06Q 30/02; G06Q 30/0261; G06Q 30/0241; G06Q 30/0259; G06Q 30/0273; H04B 7/0617; H04B 7/0695; H04B 7/0413; H04B 7/0634; H04B 7/0417; H04B 7/0452; H04B 7/0602; B64C 39/024; B64C 2201/12; B64C 2201/146

USPC ......... 455/414.2, 456.1, 456.2, 456.3, 550.1, 455/67.11

See application file for complete search history.

(56) References Cited

U.S. PATENT DOCUMENTS

| | | | |
|---|---|---|---|
| 7,072,666 B1 | 7/2006 | Kullman et al. | |
| 2003/0186710 A1* | 10/2003 | Muhonen | H04W 4/02 455/456.5 |
| 2004/0021569 A1* | 2/2004 | Lepkofker | G01C 21/206 340/568.1 |
| 2004/0116134 A1* | 6/2004 | Maeda | H04B 7/1855 455/457 |
| 2004/0198390 A1* | 10/2004 | Kaise | G06Q 30/02 455/456.1 |
| 2004/0203863 A1 | 10/2004 | Huomo | |
| 2005/0037798 A1* | 2/2005 | Yamashita | H04W 36/04 455/525 |
| 2005/0134503 A1* | 6/2005 | Colley | G01S 19/05 342/357.58 |
| 2005/0181808 A1* | 8/2005 | Vaudreuil | H04W 48/04 455/456.3 |
| 2006/0064346 A1* | 3/2006 | Steenstra | G06Q 30/0261 705/14.64 |

* cited by examiner

METHOD FOR PERFORMING LOCATION-SPECIFIC SERVICES, BROADCASTING UNIT AND MOBILE RECEIVING DEVICE

CLAIM OF PRIORITY

This application is a continuation of U.S. patent application Ser. No. 11/909,766 filed on Sep. 26, 2007, which claims priority from and is the national stage entry of International (PCT) Patent Application Serial No. PCT/CH06/00182 filed on Mar. 29, 2006, which in turn claims priority from Swiss Patent Application Serial No. 00531/05, filed on Mar. 29, 2005. Each of the above identified applications is hereby incorporated herein by reference in its entirety.

TECHNICAL DOMAIN

The present invention relates to a method for performing location-specific services, a broadcasting unit suitable for this purpose, and a mobile receiving device suitable for this purpose. The present invention relates in particular to a method for performing location-specific services of a broadcasting unit, a broadcasting unit, a mobile receiving device which is set up to establish its current position, and a computer program product for controlling the mobile receiving device. In particular, the present invention relates to a method and associated suitable devices for setting up cells for location-specific services of a broadcasting unit.

PRIOR ART

Location-specific services (also referred to as Location Based Services) are known in particular in mobile communications, where mobile receiving devices are supplied with different services and/or information depending on their current geographical position. The known location-specific services are implemented using a wide range of services and mechanisms, for example E-OTD (Enhanced Observed Time Difference), FOTA (Forced Timing Advance), TA (Timing Advance), TDMA (Time Division Multiple Access), TDOA (Time Difference On Arrival), TOA (Time On Arrival). Combination systems, in which satellite-based location systems, such as GPS (Global Positioning System) or Galileo, are combined with communications systems, such as communications terminals for GSM (Global System for Mobile Communication) or UMTS (Universal Mobile Telecommunication System), are also used with increasing frequency to perform location-specific services.

A system for location-specific services from a broadcasting system is described in the patent application WO0143364. According to WO0143364, a mobile receiving device is provided with a positioning system (GPS), a broadcast receiver and a radio transmitter and, on the user's instruction, transmits the current position, the current set reception frequency and the time and user data in a wireless manner to a control center. The control center determines an information content according to the received data and makes this available to the user in a database accessible via the Internet. However, this system has the disadvantage that, in order to provide the location-specific information content, a back channel must be provided for the communication from the mobile receiving device to the control center.

Broadcast systems are normally very extensive systems with service areas of, for example, several hundred to several thousand square kilometers. For operators of the broadcast systems (broadcasters), it is economically important to reach as many listeners as possible with a small number of transmitters. On the other hand, location-specific services are often appropriate or necessary only within a small to very small area, for example with a diameter of one to ten meters, within the specified service area. However, the known systems and methods for providing location-specific services and for the transfer of location-specific information by a broadcasting system generally have the disadvantage that their often very large service areas cannot be adapted with sufficient flexibility to service-specific and/or geographical requirements and/or conditions.

PRESENTATION OF THE INVENTION

One object of the present invention is to propose a method, a broadcasting unit and a mobile receiving device to perform location-specific services of the broadcasting unit which do not have the disadvantages of the known systems. One object of the present invention is in particular to propose a method and associated suitable devices for setting up cells for location-specific services of a broadcasting unit which can be adapted in a flexible manner to service-specific and/or geographical requirements and/or conditions.

According to the present invention, these objects are achieved in particular by the elements of the independent claims. Further advantageous design forms are furthermore indicated in the dependent claims and the description.

The aforementioned objects are achieved by the present invention in particular in that cells are set up for the location-specific services in order to perform location-specific services of a broadcasting unit in that cell data which define a regional cell area are transferred by the broadcasting unit to a mobile receiving device, and the cell data are stored in the mobile receiving device. The cell areas which correspond to target areas which are to be served are defined, for example, by center data and radius. In one design variant, the cell data define a cluster of a plurality of regional cell areas, whereby in particular more complex forms of interconnected areas can be defined. The current position of the mobile receiving device is determined in the mobile receiving device and the current presence of the mobile receiving device in the cell area is determined by the mobile receiving device on the basis of the current position. This means that it is determined in the mobile receiving device on the basis of the current position of the mobile receiving device whether the mobile receiving device is located in the cell area which is defined by the cell data. In the event of a positively determined presence of the mobile receiving device in the cell area, a service assigned to the cell data is performed in the mobile receiving device. This means that, on the basis of further data elements which are contained in the cell data or are assigned to the cell data, services are defined which are performed by the mobile receiving device when the mobile receiving device is located in the cell area which is defined by the cell data. The setting up of cells for the location-specific services by the broadcasting unit in a multitude of mobile receiving devices in the service area of the broadcasting unit enables the service area to be split up into smaller, interactive and virtual (service) cells and cell clusters in a dynamic and optimum manner according to need and geographical and/or service specific parameters. Cells of this type can be referred to as broadcast service cells for location-specific services or BLBS cells (Broadcast Location Based Services). Here, it is possible to specify a plurality of partially or fully overlapping cell areas for different applications and services which, for example, change dynamically according to defined time patterns. The cell areas can be defined as very small, having, for example a diameter of a few meters. The cell areas can even be defined within buildings. Moreover, the cell areas may be located outside the service areas of the broadcasting units (transmitters), so that mobile receiving devices receive and store cell data in the reception area of the transmitters and only later, on arrival in the cell areas defined by the cell data, do they respond accordingly. For example, on a first day in a first city, a mobile receiver of this type can receive cell data relating to cell areas in a second city, only responding accordingly on the following day in the corresponding cell areas in the second city.

The location-specific services preferably comprise a data transfer from the broadcasting unit to the mobile receiving device. In the event of a positively determined presence of the mobile receiving unit in the cell area, received data which are assigned to the cell data are accepted and processed in the mobile receiving device. Depending on the application and/or design variant, the cell data and user data are transferred together or separately from the broadcasting unit to the mobile receiving device. In the preferred latter case, the cell data comprise a cell identification and the broadcasting unit transfers the user data together with the cell identification separately from the cell data to the mobile receiving device. The mobile receiving device assigns the received user data to the stored cell data on the basis of the cell identification. If the mobile receiving device is located in the cell area defined by the cell data, the mobile receiving device accepts the received user data for further processing. Otherwise, the received data are deleted or discarded. This preferred design variant enables a method for transferring data from the broadcasting unit to the mobile receiving device, in which method the cell data which define the regional cell area are transferred by a broadcasting unit to a mobile receiving device; the cell data are stored in the mobile receiving device; the current position of the mobile receiving device is determined; the current presence of the mobile receiving device in the cell area is determined by the mobile receiving device on the basis of the current position; and received data which are assigned to the cell data are accepted and processed in the mobile receiving device in the event of a positively determined presence of the mobile receiving device in the cell area. For example, information relating to the road condition can be transferred into a cell cluster along a motorway, or an alarm into an area in which a chemical accident has occurred.

In one design variant, the cell data comprise an instruction (run command). The instruction serves to initiate and perform further instruction-specific services which are assigned to the cell data. In the event of a positively determined presence of the mobile receiving device in the cell area, the instructions are carried out in the mobile receiving device. The receiving devices are furthermore able to carry out the instructions even if the transmitter concerned is out of service, since the cell data are previously stored.

In a further design variant, the cell data comprise a cell type. Received data assigned to the cell data are further processed in the mobile receiving device depending on the cell type. This means that, if the mobile receiving device is located in the cell area defined by the cell data to which the received data are assigned, the received data are further processed according to the cell type of these cell data. The cell type comprises, for example, an alarm type for alarms, an information type for information data of different categories, an application type for executable applications and/or a link type for hyperlinks. The cell type defines the intended use, i.e. the service type and/or data type, and, in one design variant, (also) comprises the aforementioned instruction. This means that a cell in each case has a cell type corresponding to the intended use and, in addition to its designation, also comprises or defines a run command (instruction). For example, in the case of the alarm type parameter (emergency call, emergency 911) in a receiving device, the position of which is located in the cell area, the corresponding run command ("Alarm") is normally carried out automatically. Alarm cells of this type are provided, for example, for authorized persons only, e.g. authorities, and cannot normally be de-activated (deselected) by users (see the following section). The information type parameter is preferably divided up into several categories (sub-types) and serves as targeted information for users who wish to receive the corresponding categories of information and who are located in the cell area concerned. The application type parameter is used to transfer executable program sequences (program modules) to mobile receiving devices in which this cell type is selected and which are located in the cell area concerned. The link type parameter is used to transfer executable or accessible hyperlinks to mobile receiving devices. The hyperlink is activated, for example, immediately following reception if the cell type concerned is activated and the receiving device is located in the cell area concerned.

In one design variant, the mobile receiving device accepts selection commands from the user to select cell types. The service assigned to the cell data is performed in the mobile receiving device in the event of a positively determined presence of the mobile receiving device in a cell area with the selected cell type. This means that the service assigned to the cell data is performed in the mobile receiving device if the mobile receiving device is located in the cell area defined by the cell data, and if the cell data have a cell type which was selected by the user. For example, received data which are assigned to cell data with a selected cell type are accepted by the mobile receiving device for further processing if the mobile receiving device is located in the cell area defined by these cell data.

In one design variant, the cell data define a three-dimensional regional cell area. In a corresponding manner, a current three-dimensional position of the mobile receiving device is determined and the current presence of the mobile receiving device is determined in the three-dimensional regional cell area on the basis of the current three-dimensional position. Spatial cell areas can thus be defined, and definable levels can therefore be spatially defined as cell areas in tall (multistory) buildings.

In a further design variant, the cell data comprise validity data which define a temporal validity of the regional cell area. The validity data comprise, for example, a start instruction for instant activation of the cell area (provision of the cell), a stop instruction for immediate de-activation of the cell area (de-activation of the cell), a start time value with a stop time value for the definition of a time window (life of the cell), and/or a start time value with a time duration for the definition of the time window.

Along with the method for performing location-specific services of a broadcasting unit, a broadcasting unit suitable for this purpose and a mobile receiving device suitable for this purpose, the present invention furthermore relates to a computer program product with computer program code means for controlling one or more processors of the mobile receiving device in such a way that the mobile receiving device receives and stores cell data which define a regional cell area and which are transmitted by the broadcasting unit, determines a current presence of the mobile receiving device in the cell area on the basis of the current position, and performs a service assigned to the cell data, in the event of positively determined presence of the mobile receiving device in the cell area. The computer program product comprises in particular a computer-readable medium on which the computer program code means are stored. This computer program product offers the advantage that it renders standard mobile receiving devices usable, said devices having position-defining means, for the performance of location-specific services in virtual broadcast service cells.

BRIEF DESCRIPTION OF THE DRAWINGS

A design of the present invention is described below with reference to an example. The example of the design is illustrated by the following appended figures.

WAYS TO CARRY OUT THE INVENTION

Figure 1:
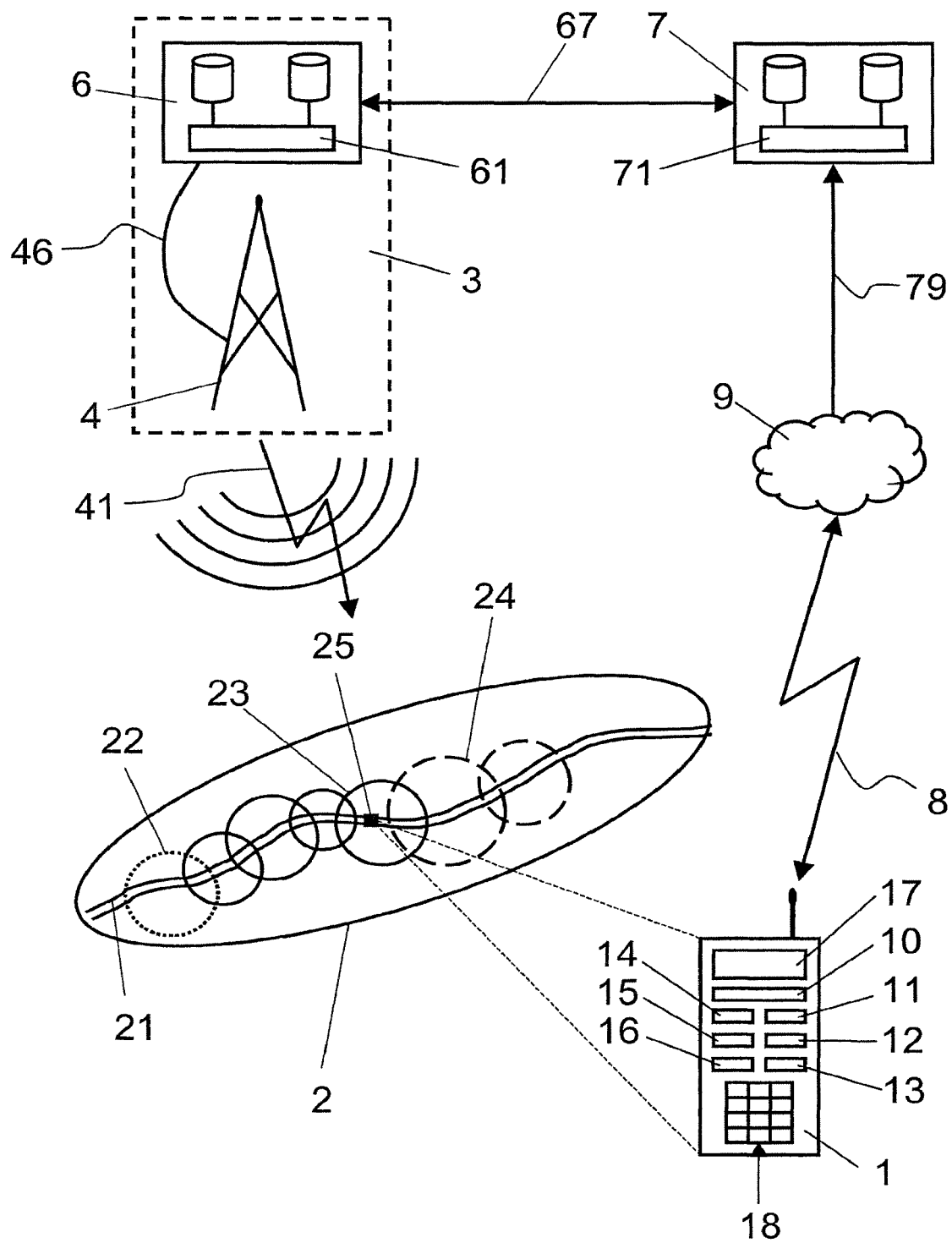
FIG. 1 shows a block diagram which schematically illustrates a system for performing location-specific services, said system comprising a broadcasting unit for the wireless transfer of data to a mobile receiving device.

In FIG. 1, the reference number 3 designates a broadcasting unit with a broadcasting system 6 (broadcaster) and a broadcast transmitter 4 (broadcast sender) for the wireless transfer of data, in particular to mobile receiving devices 1. The reference number 46 refers to the connection of the broadcasting system 6 and the broadcast transmitter 4, for example via a communications connection and/or a transmitter feeder. As shown schematically in FIG. 1, the broadcasting unit 3 comprises a cell-determination module 61, which is preferably designed as a programmed software module for controlling a computer of the broadcasting unit 3, the function of which will be described later. The broadcasting unit 3 is set up, for example, for broadcast-based data transfer via DAB (Digital Audio Broadcasting), DMB (Digital Multimedia Broadcasting), DVB (Digital Video Broadcasting) and/or DVB-H (Digital Video Broadcasting—Handheld). Along with the conventional one-way broadcasting systems, two-way communication systems can also be used for broadcast-based data transfer. Thus, the broadcasting unit 4 is, for example, set up, in particular for smaller service areas, for broadcast-based data transfer via WLAN (Wireless Local Area Network, e.g. in accordance with the 802.11 IEEE standards), whereby the WLAN has a back channel for the data communication from the receiving device 1 to the broadcasting unit 3 or to a content delivery system 7 (content provider), in the same frequency band as the broadcast channel or in a different frequency band. The content delivery system 7 is connected via the communications line 67 to the broadcasting unit 3. Along with WLAN, further communications systems suitable for broadcast-based data transfer, for example OFDM (Orthogonal Frequency Division Multiplexing), in particular in connection UMA (Unlicensed Mobile Access, Bluetooth) are advantageous (economical and flexible). FIG. 1 indicates the broadcast-based transfer of data and media content of broadcast transmissions by means of the one-way arrow 41.

The mobile receiving device 1 is a two-way communications terminal device or a purely one-way receiving device. The mobile receiving device 1 comprises a communications module 10, which is set up to receive broadcast transmissions 41 from the broadcasting unit 3. In one design variant, the communications module 10 is furthermore set up to establish a communications connection 79 via the air interface 8 and the mobile radio network 9 for return messages to the content delivery system 7 and/or the broadcasting system 6. The mobile radio network 9 comprises, for example, a GSM network (Global System for Mobile Communication), a UMTS network (Universal Mobile Telecommunication System) or a different, for example satellite-based, mobile radio network, a WLAN, an OFDM-based network or a Bluetooth cell. Depending on the design variant, the mobile receiving device 1 is, for example, designed as a mobile telephone, PDA computer (Personal Digital Assistant), notebook or laptop computer, or as a radio or television receiver. Along with a display 17 and input elements 18 (keypad, joystick, etc.), the mobile receiving device 1 comprises a plurality of functional modules, i.e. a control module 11, a cell-determination module 12, a position-determination module 13, a presence determination module 14, a service module 15 and a selection module 16.

The position-determination module 13 is set up to determine the current (local, geographical) position of the mobile receiving device 1, for example by means of GPS, Galileo or terrestrial location systems, for example network-based location systems such as E-OTD. In one variant, the position-determination module 13 is set up to determine the current position by means of A-GPS (Assistant Global Positioning System), e.g. from Global Locate Inc., even within buildings (Indoor GPS), so that extremely small regional cell areas can be determined within buildings. The position can also be determined on the basis of information from a mobile radio network. In one variant, the position-determination module 13 is furthermore set up to determine the current altitude and therefore the current three-dimensional position of the mobile receiving device 1, for example by means of an altitude measurement module. The altitude measurement module is set up, for example, to determine the altitude via GPS.

Figure 2:
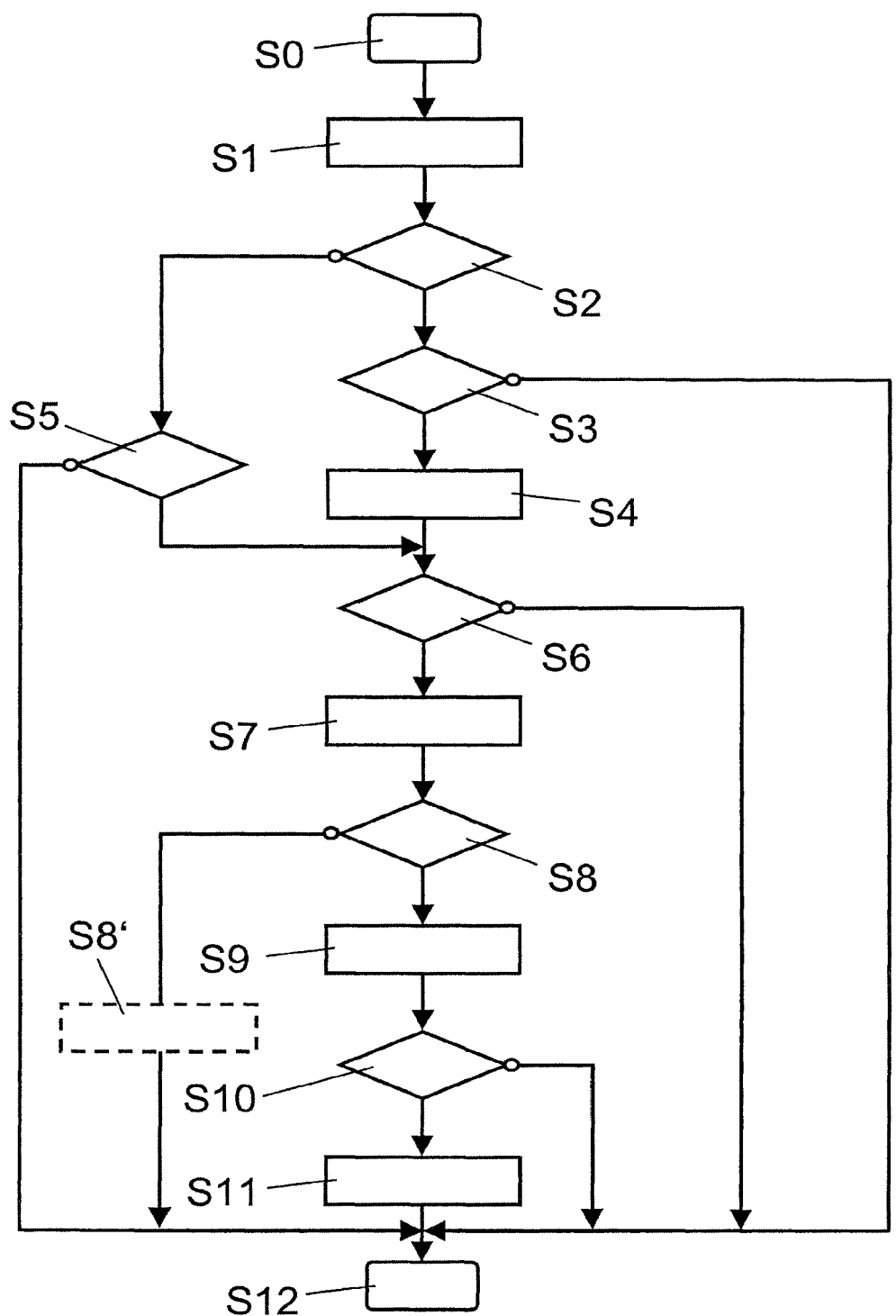
FIG. 2 shows a flow diagram which illustrates an example of a step sequence for performing location-specific services.

The remaining functional modules, the functionality of which is described below with reference to FIG. 2, are preferably designed as programmed software modules on a computer program product which is permanently or detachably connected to the mobile receiving device 1.

The mobile receiving device 1 preferably also comprises a charging module to charge for services, for example based on the Conditional Access method incorporating the ECM (Entitlement Checking Message), EMM (Entitlement Management Message) and CW (Control Word). Conditional Access processes can also be integrated, as described in patent applications WO01/67761 and WO01/67762.

In FIG. 1, the reference number 2 refers to the extended service area which is covered by the broadcasting unit 3. As shown in FIG. 1, a road 21, for example, passes through the service area 2. The current position of the mobile receiving device 1 is designated in the service area 2 with the reference number 25. The reference numbers 22, 23 and 24 designate different cells with different two-dimensional and/or three-dimensional local or spatial cell areas (areas, e.g. circle, and/or volume, e.g. sphere) which are defined, for example, by a cell center and a cell radius and/or other cell area data (coordinates, size data, location or area designations, size and/or form data). A plurality of cells form, for example, a cluster, and the individual cell areas are assigned to a cell cluster for this purpose, for example by means of a cluster identification. In FIG. 1, different line types designate inactive cells 22, active cells 23 and cells 24 which are in preparation.

The individual cells 22, 23, 24 are described by cell data which define not only the cell area but also a cell type. As already described in the introduction, examples of cell types include the alarm type, the information type, the application type and/or the link type. The cell type defines the intended use of a cell, for example the service type of a location-specific service and/or the data type of location-specific information. As part of the cell type, contained within the cell type or as a separate data element, the cell data preferably also comprise an instruction or run command. The cell data also comprise, for example, validity data which define a temporal validity of the relevant cell or the relevant cell area. Depending on the design variant, the cell data also comprise a cell identification, for example a code, a number or a name. In one design variant, the cell type and/or the instruction are designed separately from the other cell data as logic data, and are, for example, assigned via the cell identification to the cell data.

The data and media content of a broadcast transmission 41 are provided in the content delivery system 7 or in the broadcasting system 6. The content provider preferably combines the information to be transmitted (e.g. alarms) with position parameters, for two-dimensional (areas) or three-dimensional (volume) BLBS cells. The cell data are generated in the broadcasting system 6 and/or in the content delivery system 7. Logic data, separate if necessary, are generated in the broadcasting system 6, in the content delivery system 7 and/or in a specific logic delivery system. In one design variant, the content delivery system 7 comprises a cell-determination module 71 corresponding to the cell-determination module 61 for this purpose. For dynamic definition of the cells 22, 23, 24 and their cell areas, the cell data and the logic data, separate if necessary, are transmitted from the cell-determination module 61 via the broadcast transmitter 4. User data, to which at least some of the cell data relate, are transmitted from the broadcasting unit 3 together with the corresponding cell data or via a cell identification separately from the cell data.

The selection module 16 is set up to list available or subscribed cell types for the user on the display 17, and to accept instructions for the selection or deselection of these cell types from the user via the input elements 18. This is particularly appropriate if a large number of cell types is available and the user does not wish to have the entire selection activated. Specific cell types, in particular the alarm type, can preferably not be deselected by the user, so that information, e.g. the alarm information, can actually be transmitted to all users in the target area in the event of an emergency.

In the step S0, the user moves with his mobile receiving device 1 into the service area 2 of the broadcasting unit 3.

In the step S1, the mobile receiving device 1 receives data which are transmitted by the broadcasting unit 3, for example program-accompanying data, which are embedded in broadcast transmissions 41.

In the step S2, the control module 11 determines whether the data received in the step S1 comprise cell data. If no cell data have been received, the control module continues in the step S5, otherwise, in the step S3.

In the step S3, the control module 11 determines whether the cell type of the received cell data has been selected by the user in the mobile receiving device 1 (for example in a local cell type table). If the cell type of the received cell data is not selected, the control module continues in the step S12, otherwise in the step S4.

In the step S4, the cell-determination module 12 accepts the received cell data and stores them in the mobile receiving device 1.

In the step S5, the control module 11 checks whether the data received in the step S1 have already been assigned to existing cell data which are stored in the mobile receiving device 1 and which have a cell type selected by the user. If the received data are not assigned to any cell data with a selected cell type, the control module continues in the step S12, otherwise in the step S6.

In the step S6, the control module 11 checks whether the cell or cell area defined by the cell data stored in the step S4 or assigned in the step S5 is active (valid). This means that the control module 11 checks whether the validity data of the relevant cell data define a time window which comprises the current time, or whether the cell data stored in the step S4 have a start instruction for immediate activation of the relevant cell area. The current time may be derived, for example, from the GPS signal. If the cell data or cell area is active, the control module 11 continues in the step S7, otherwise in the step S12.

In the step S7, the position-determination module 13 determines the current two-dimensional or three-dimensional position of the mobile receiving device 1.

In the step S8, the presence-determination module 14 determines whether the current position determined in the step S7 is located in the cell area defined by the cell data stored in the step S4 or assigned in the step S5. This means that the presence-determination module 14 determines the current presence of the mobile receiving device 1 in the relevant cell area. For example, the presence-determination module 14 determines whether the current position of the mobile receiving device 1 is located in an area or sphere defined by the cell data. In the event of a positively determined presence of the mobile receiving device 1 in the relevant cell area, i.e. if the mobile receiving device 1 is located in the relevant cell area, the control module 11 continues in the step S9, otherwise in the step S12.

In the step S9, the service module 15 performs the location-specific service defined by the cell data stored in the step S4 or assigned in the step S5. To perform the location-specific service, the aforementioned cell data and, if necessary, further user data assigned to the cell data are used which, for example, were received together with the cell data in the step S1 or which were received separately in the step S1 and were assigned to the stored cell data in the step S5. The service module 15 determines the service to be performed on the basis of the logic data which comprise the cell type and/or the assigned instruction and which were received as part of the cell data or separately assigned to the cell data. In the case of the cell type/instruction for alarms, for information and information categories (sub-types), the assigned alarm information or categorized other information (stored data or data transmitted together with the cell data) are reproduced directly to the user, for example visually and/or audibly. In the case of the cell type/instruction for applications or links, the assigned executable program sequences, program files (applets), applications (stored data or data transmitted together with the cell data) are run on the mobile receiving device 1, or the assigned link (stored or jointly transmitted) is accessed. Location-dependent applications comprise, for example, executable or multimedia files (e.g. only conditionally usable in accordance with "Conditional Access"), which, for example, are additionally networked with a link in order to set up a connection via a communications network 9 so that further data can be loaded onto the mobile receiving device 1. Location-dependent links refer, for example, to chargeable information.

In the step S10, the control module 11 checks whether the relevant cell needs to be de-activated, i.e. whether the cell data stored in the step S4 comprise a stop instruction for the immediate de-activation of the cell area, or whether the cell data assigned in the step S5 comprise validity information with an expired time window. If the relevant cell needs to be deactivated, the control module 11 continues in the step S11, otherwise in the step S12.

In the step S11, the control module 11 de-activates the relevant cell, for example, by deleting the corresponding cell data in the mobile receiving device 1.

In the step S12, the control module 11 ends a cycle for processing received broadcast data in the service area 2 and, in the step S1, receives new data from the broadcasting unit 3.

In one design variant, the user can use the control module 11 to display information relating to available services in adjacent cells 22, 23, 24 on the display 17. In the optional step S8, the control module 11 stores, for example, cell data for cell areas in the vicinity of the current position 25 of the mobile terminal device 1 for this purpose, for example limited to within a specific radius of the current position 25.

Finally, the following examples of applications are cited: definition of virtual service cells or cell clusters along a highway (road 21) for the provision of information relating to the road condition; in an area with a large chemical industry presence for the transmission of alarms in the event of chemical accidents; in tourist areas for the dynamic, targeted delivery of information depending on location and time; in large building complexes for floor-specific or and/or room-specific targeted information transfer (e.g. public buildings such as railway stations or airports), or also in other premises with small areas or rooms, for example museums, exhibitions and events of any type for targeted information delivery in large, broadcasting areas providing blanket coverage.

What is claimed:

1. A method comprising:
   receiving by a mobile receiving device, from a broadcasting unit, geographic data corresponding to a service area associated with the broadcasting unit, wherein:
     the geographic data defines a three-dimensional geographic space and comprises a cell type classification for each of a plurality of service-specific cells,
     the plurality of service-specific cells is defined and/or modified dynamically, based on one or more operational criteria,
     each of the plurality of service-specific cells covers a different portion of the service area of the broadcasting unit,
     each of the plurality of service-specific cells provides services based on broadcast transmissions from the broadcasting unit, and
     the cell type classification defines for a corresponding cell one or more specific services based on at least one intended use for the cell, the one or more specific services are provided based on the broadcast transmission of the broadcasting unit;
   determining a service provided in the three-dimensional geographic space, the determining comprising:
     identifying based on the three-dimensional geographic space, a corresponding cell from a plurality of service-specific cells; and
     determining based on a cell type classification corresponding to the identified cell, a corresponding location-specific service associated with the identified cell; and
   performing the service provided in the three-dimensional geographic space, wherein the service is adaptively performed based on the cell type classification corresponding to the identified cell.

2. The method of claim 1, wherein the geographic data comprises an instruction; and comprising:
   carrying out the instruction in the mobile receiving device, when the mobile receiving device is present in the three-dimensional geographic space.

3. The method of claim 1, wherein the service comprises data transfer from the broadcasting unit to the mobile receiving device; and comprising, when the mobile receiving device is present in the three-dimensional geographic space:
   receiving data associated with the geographic data; and
   processing the received data in the mobile receiving device.

4. The method of claim 1, comprising processing in mobile receiving device received data based on the cell type classification corresponding to the identified cell.

5. The method of claim 4, wherein the cell type classification comprises at least one value selected from: alarm type for alarms, information type for information data of various categories, application type for executable applications, and link type for hyperlinks.

6. The method of claim 4, comprising:
   accepting selection commands at the mobile receiving device from a user for selection of cell type classification; and
   performing the service based on the selected cell type classification.

7. The method of claim 1, wherein the geographic data comprises validity data which defines a temporal validity of a particular geographic space, the validity data comprising at least one of:
   a start instruction for instant activation of the geographic space,
   a stop instruction for immediate deactivation of the geographic space,
   a start time value and stop time value for defining a time window, and
   a start time value and a duration for defining a time window.

8. The method of claim 1, wherein the geographic data defines a cluster of geographic spaces.

9. The method of claim 1, comprising:
   determining in the mobile receiving device a current three-dimensional geographic position of the mobile receiving device; and
   determining by the mobile receiving device, based on the current three-dimensional geographic position of the mobile receiving device, presence of the mobile receiving device in the three-dimensional geographic space.

10. The method of claim 1, comprising receiving by the mobile receiving device, from the broadcasting unit, the user data, wherein the user data is assigned by the broadcasting unit to the geographic data.

11. The method of claim 10, wherein the geographic data comprises identification data, and comprising:
    assigning by the mobile receiving device, based on the identification data, the user data to geographic data stored in the mobile receiving device.

12. A mobile receiving device, comprising:
a communications module operable to receive, from a broadcasting unit geographic data corresponding to a service area associated with the broadcasting unit, wherein:
the geographic data defines a three-dimensional geographic space,
the geographic data defines comprises a cell type classification for each of a plurality of service-specific cells,
the plurality of service-specific cells is defined and/or modified dynamically, based on one or more operational criteria,
each of the plurality of service-specific cells covers a different portion of the service area of the broadcasting unit, and
each of the plurality of service-specific cells provides services based on broadcast transmissions from the broadcasting unit;
a control module operable to determine a service provided in the three-dimensional geographic space, the determining comprising:
identifying based on the three-dimensional geographic space, a corresponding cell from a plurality of service-specific cells;
determining based on a cell type classification corresponding to the identified cell a corresponding location-specific service associated with the identified cell, wherein the cell type classification defines for a corresponding cell one or more specific services based on at least one intended use for the cell, the one or more specific services are provided based on the broadcast transmission of the broadcasting unit; and
a service module operable to perform a service provided in the three-dimensional geographic space, wherein the service is performed based on the cell type classification corresponding to the identified cell.

13. The mobile receiving device of claim 12, wherein the geographic data comprises an instruction; and
the service module is operable to carry out the instruction in the mobile receiving device, when the mobile receiving device is present in the three-dimensional geographic space.

14. The mobile receiving device of claim 12, wherein the service comprises data transfer from the broadcasting unit to the mobile receiving device; and, when the mobile receiving device is present in the three-dimensional geographic space:
the communications module is operable to receive data associated with the geographic data; and
the service module is operable to process received data.

15. The mobile receiving device of claim 12, wherein the service module is operable to process received data based on the cell type classification corresponding to the identified cell.

16. The mobile receiving device of claim 15, wherein the cell type classification comprises at least one value selected from: alarm type for alarms, information type for information data of various categories, application type for executable applications, and link type for hyperlinks.

17. The mobile receiving device of claim 15, comprising a selection module operable to accept selection commands from a user for selection of cell type classification; and
wherein the service module is operable to perform the service based on the selected cell type classification.

18. The mobile receiving device of claim 12, wherein the geographic data comprises validity data which defines a temporal validity of a particular geographic space, the validity data comprising at least one of:
a start instruction for instant activation of the geographic space,
a stop instruction for immediate deactivation of the geographic space,
a start time value and stop time value for defining a time window, and
a start time value and a duration for defining a time window.

19. The mobile receiving device of claim 12, wherein the geographic data defines a cluster of geographic spaces.

20. The mobile receiving device of claim 12, comprising a position-determination module operable to determine a current three-dimensional geographic position of the mobile receiving device; and
wherein the presence-determination module is operable to determine, based on the current three-dimensional geographic position of the mobile receiving device, presence of the mobile receiving device in the three-dimensional geographic space.

21. The mobile receiving device of claim 12, wherein the communications module is operable to receive, from the broadcasting unit, the user data, wherein the user data is assigned by the broadcasting unit to the geographic data.

22. The mobile receiving device of claim 21, wherein the geographic data comprises identification data; and
wherein the service module is operable to assign, based on the identification data, the user data to geographic data stored in the mobile receiving device.

* * * * *